United States Patent [19]

Gendrot

[11] 4,455,650
[45] Jun. 19, 1984

[54] SYSTEM OF BEACONS FOR THE TRANSMISSION OF INFORMATION

[76] Inventor: André J. C. Gendrot, 78 Ornano, 75018 Paris, France

[21] Appl. No.: 199,055

[22] Filed: Oct. 20, 1980

[30] Foreign Application Priority Data

Oct. 24, 1979 [FR] France .................. 79 26351

[51] Int. Cl.³ .................................................. H04L 5/16
[52] U.S. Cl. .................................... 370/97; 370/31; 178/71 N
[58] Field of Search ............. 178/71 N, 71 T; 370/31, 370/32, 97

[56] References Cited

U.S. PATENT DOCUMENTS 4,032,911 6/1977 Melvin, Jr. ...................... 178/71 N 4,154,978 5/1979 Tu ........................................ 370/31

Primary Examiner—Marshall M. Curtis
Attorney, Agent, or Firm—Holman & Stern

[57] ABSTRACT

The transmission system comprises a series of identical beacons, each comprising an emitter and a receiver tuned to the same frequency, the emitter being switched on as soon as a bit of information is received from another beacon, and means for cutting off the receiver as soon as the emitter is switched on, all the beacons thus being able to receive the same information simultaneously and each beacon being able to retransmit the information received from another to all the beacons not having received information. The beacons possess means for creating their own information and/or for processing information received, in turn.

9 Claims, 4 Drawing Figures

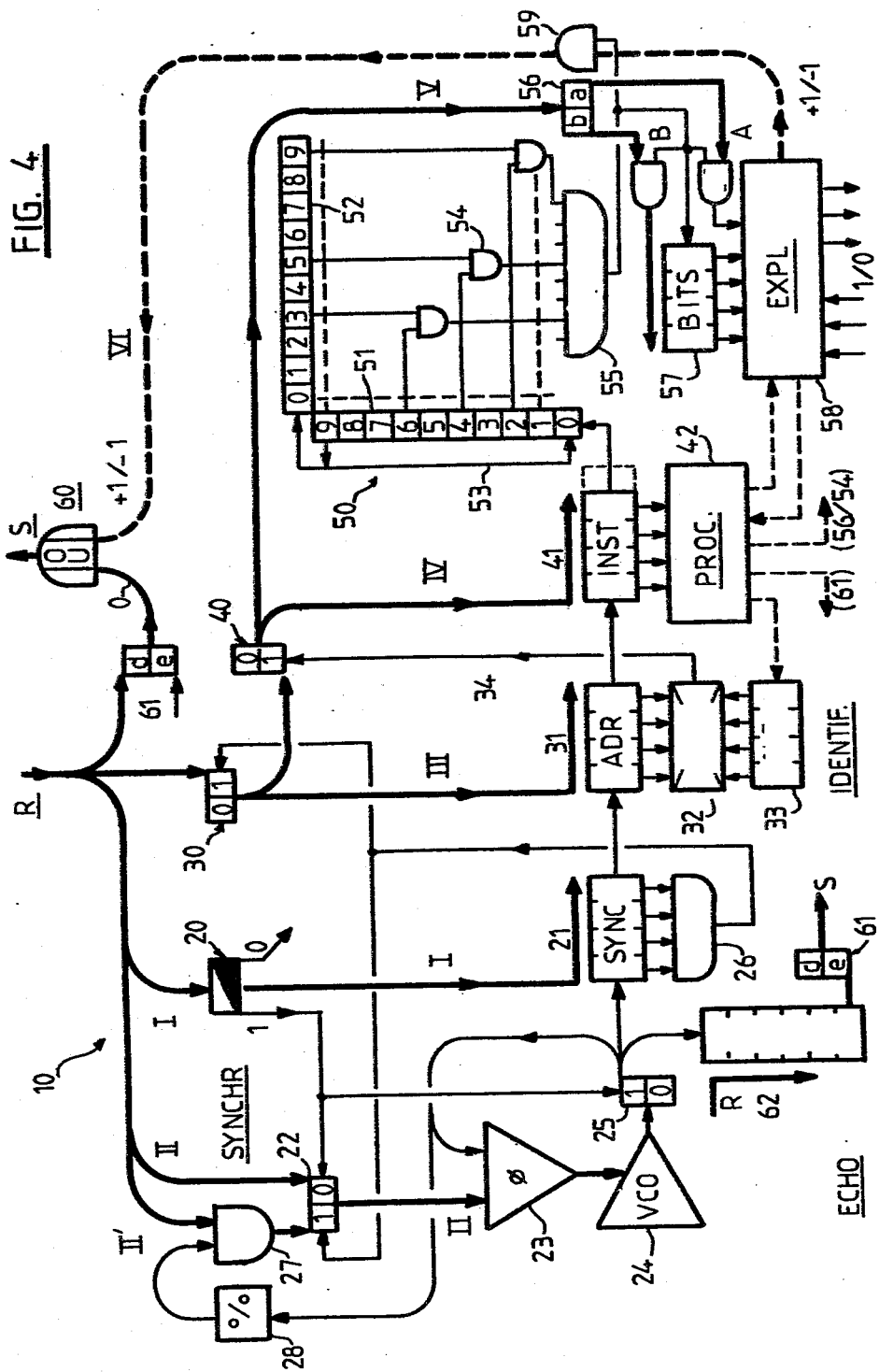

SYSTEM OF BEACONS FOR THE TRANSMISSION OF INFORMATION

BACKGROUND OF THE INVENTION

The present invention relates to a system for the transmission of information by degrees, particularly remote control information, for example for urban boiler rooms, commercial centres, factory workshops for paging isolated staff, and units of industrial exploitation in general, including a series of identical beacons, each comprising an emitter and a receiver tuned to the same frequency, the emitter being switched on as soon as a bit of information is received from another beacon, and means for cutting off the receiver as soon as the emitter is switched on, all the beacons thus being able to receive the same information simultaneously and each beacon being able to retransmit the information received from another to all the beacons not having received information.

It has already been proposed to operate from a central emitter and at one frequency, by modulation of a carrier wave by pulse signals.

The drawback of the central emitter lies, on the one hand, in the necessary power which it is obliged to develop and, consequently, in the saturation of the air space and, on the other hand, in the length of the necessary scrutinizing time. It has therefore been proposed to use a series of low-power emitters, or beacons. In fact, each beacon, for this transmission by degrees, possesses a receiver and an emitter. Transmission being effected at one frequency, each of the beacons receives, by its receiver, a signal which it detects and which it retransmits immediately, or after a very short phase shift, by its emitter. However, without any other arrangement, the receiver of each beacon would receive the signal again upon its emission by the emitter of this beacon. To avoid this phenomenon of looping, it has therefore been proposed to cut off the receiver of the beacons during their period of emission.

In addition, it was known to use only one type of signal, with the result that the detection of the leading edge of this signal, by the receiver of a beacon, sufficed for the retransmission of this signal by its emitter, its receiver being cut off.

Thus, a system of beacons was known, in which each beacon emits a signal towards all those which have not received it, being given that all those which emit have their receiver cut off and that this transmission by degrees, apart from the slight phase shift mentioned hereinabove, is instantaneous. In such a system, there is no looping, the signal progresses in the manner of a wave, from beacon to beacon, and all the beacons are virtually synchronous.

Heretofore, the information at each beacon was processed before being retransmitted. This resulted in a loss of time. In addition, this retransmission was effected only after an information signal or word was received completely. This was another reason for loss of time.

SUMMARY OF THE INVENTION

It is an object of the present invention to overcome the latter drawback.

It is a further object of the present invention to avoid a phenomenon of jamming which would result from the fact that all the beacons receive the information and that they must all be able to respond, i.e. transmit information which is peculiar thereto. In other words, it is an object of the present invention to provide a system of beacons in which there are never two beacons emitting their own information simultaneously, the beacons nevertheless being able to continue to transmit the information received from the upstream beacon or beacons towards the or each downstream beacon.

More particularly, the invention envisages allocating to each beacon a space-time for processing its order, for example by emitting requested information to all beacons located downstream. In other words, it is an object of the invention to scrutinize all the beacons of a system at the same time, the responses of the beacons being transmitted in turn but in a very short space of time, and to provide a system operating in positive logic, in which a beacon which has broken down may be detected by the silence occurring in its space-time.

Finally, the invention envisages providing an extremely flexible system of beacons in which the direction of transmission is unimportant and in which each beacon may be a beacon of origin sending to another so-called control beacon a wave of information.

To this end, the present invention relates to a system for the transmission of information of the type defined hereinabove, characterized in that transmission is effected bit by bit and the beacons possess means for creating their own information and/or for processing information received, in turn.

In a preferred embodiment of the system of the invention, each beacon comprises counting means arranged to recognize the beginning of a space-time allocated to this beacon to create its own information and/or process the information received.

BRIEF DESCRIPTION OF THE DRAWINGS

The invention will be more readily understood on reading the following description with reference to the accompanying drawings, in which:

FIG. 4 is a schematic functional diagram of the linkage circuits between the receiver and the emitter of a beacon of the system of the invention.

DESCRIPTION OF A PREFERRED EMBODIMENT

Figure 1:
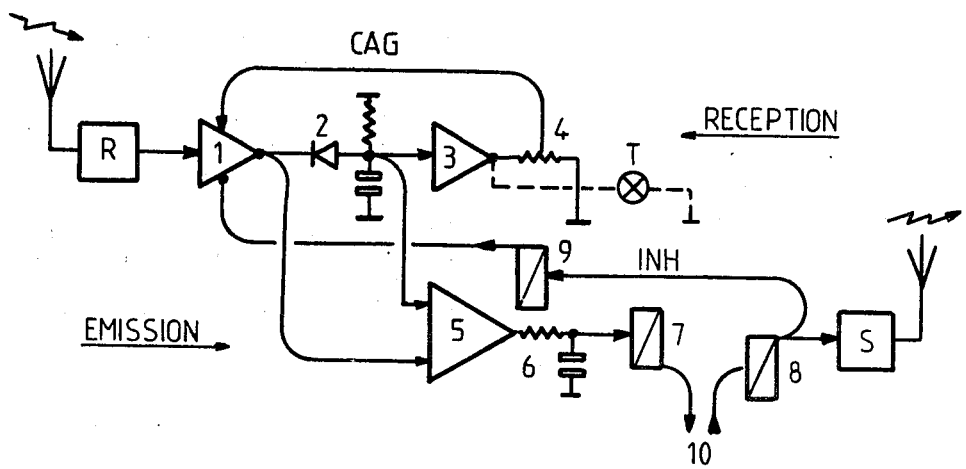
FIG. 1 is a schematic functional diagram of a beacon of the system of the invention.

Referring now to the drawings, the beacon of FIG. 1 essentially comprises a receiver R and an emitter S, tuned to the same carrier frequency, which is modulated by "all or nothing", by successive trains of pulses of constant width.

The signals picked up by the receiver R, then processed by a shaping amplifier 1, are applied to a detector/integrator assembly 2 including a capacitor whose charging voltage, indicating the mean level of the detected signals, is applied, via an amplifier-adapter 3, to a potentiometer 4 arranged for controlling the gain of the amplifier 1, and possibly to a pilot T indicating the presence of carrier wave.

Each pulse signal, detected by the diode of the assembly 2, is applied between the inputs of a differential amplifier 5. If the level of the detected signal exceeds a determined threshold, this amplifier furnishes a constant current to an integrator assembly 6. The amplifier 5 is therefore a carrier wave detecting device eliminating parasites. If the duration of the detected signal exceeds a determined value, the charging voltage reached by the capacitor of the assembly 6 allows a monostable multivibrator 7 to be energized, which produces, in response, a calibrated pulse validating the correct reception of a signal. The circuit 6,7 is therefore arranged to allow reception.

This validation pulse is applied to a second monostable multivibrator 8, via linkage circuits 10 (not shown) and which will be described hereinafter in connection with FIG. 4, in order, on the one hand, to control the emission by the emitter S of a pulse signal identical to the one picked up by the receiver R, as soon as an information bit is received from another beacon and, on the other hand, to block reception at least during the time of this re-emission, by inhibiting the amplifier 1 by a third monostable multivibrator 9.

Thus, all the beacons of the system of the invention may simultaneously receive the same information, each beacon retransmitting the information received from another beacon to all the beacons not having received information.

Figure 2:
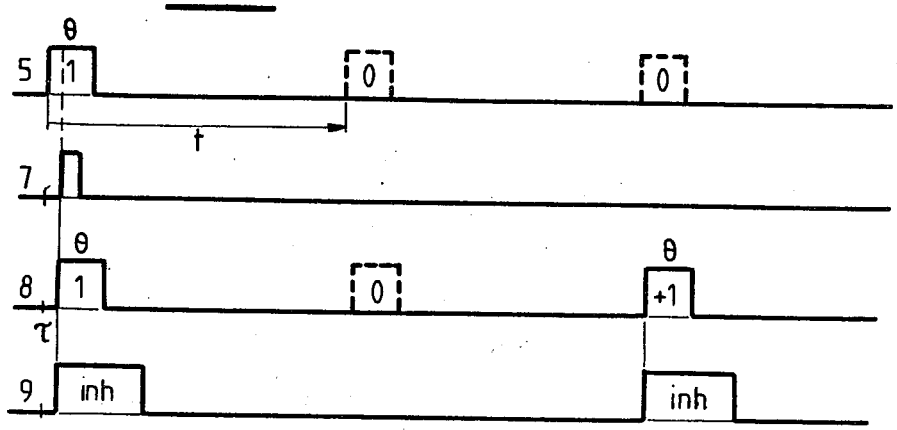
FIG. 2 is a timing chart of the signals of a beacon.

The first line of FIG. 2 shows the output information pulses of the amplifier 5 which, under the best transmission conditions, are identical to the pulses used at origin to modulate the carrier wave. Their duration $\theta$ is preferably relatively short with respect to their recurrence period t, and their level remains substantially constant for the whole of their duration. The broken lines in FIG. 1 illustrate the absence of such pulses.

The second line in FIG. 2 shows a reception validation pulse issuing from the monostable multivibrator 7 of which the duration and level are a priori immaterial and determined solely by the operational needs of the circuits. It will be noted that this validation pulse is produced only after a certain time after the beginning of reception, but this time is in fact relatively very short.

The third line of FIG. 2 shows two pulses produced by the monostable multivibrator 8, which present the same duration as the pulses emitted at origin and which are used for modulating the emitter S, in order to repeat the signal received identically, albeit with a relative delay but which is sufficiently slight for them to be considered as simultaneous.

Finally, the fourth line of FIG. 2 shows the reception inhibition pulses accompanying each re-emitted pulse, to avoid any local looping of the transmission. It will be noted that these inhibition pulses are of longer relative duration than the information pulses, in order to eliminate any risk of interference; for this same reason, they might start as soon as reception is validated, the monostable multivibrator 9 being to this end controlled upon energization of the monostable multivibrator 7. In any case, the monostable multivibrator 9 is controlled by the monostable multivibrator 8, for the receiver R to be cut off when the beacon transmits its own information.

Figure 3:
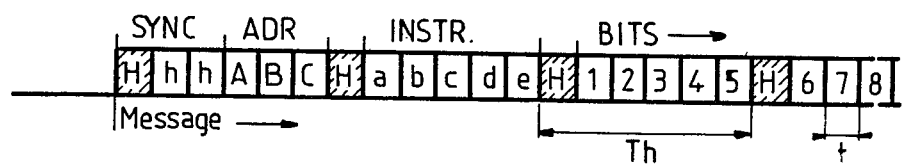
FIG. 3 is an example of a message, or packages of bits or bytes transmitted by the system.

FIG. 3 shows a message transmitted by the system, composed of a series of beacons identical to that of FIG. 1. After a silence, or "blank" time, of any duration, the emission of a message begins by a clock pulse H, immediately followed by a plurality of synchronisation pulses h. The consecutive pulses A,B,C form a binary addressing code making it possible selectively to activate the beacons of the system to which is attributed a corresponding identification key; this code may be of any format but is invariable. The following part of the message possibly comprises an instruction abcde, intended for a processor incorporated in the beacons, then a sequence of bits 1–8 . . . , each previously activated beacon taking into account that bit or those bits of locally specified rows, consequently during a space-time allocated to the beacon. The number of these bits in each message may be any number, but is limited to a determined maximum value, for example one hundred. In other words, the transmission of the messages, with the system of beacons of the type described hereinabove, is effected bit by bit, and the generation of information peculiar thereto, or processing of information received by a beacon, is effected in turn, beacon by beacon.

It will be noted that the pulses indicating addressing code, instruction and bits are intercalated between clock pulses H repeated with a recurrence period Th which is a multiple of the period between consecutive pulses t.

By way of example, t may be taken to be equal to 1 ms, T to 10 ms, $\tau$ being equal to 100 $\mu$s.

FIG. 4 shows the functional diagram of the linkage circuits 10, by which the reception circuits R are coupled to the emission circuit S, to ensure re-emission identically or after processing of the previously received signals. It is obvious that the symbols used for representing the different elements of these circuits 10 have only explanatory value and in no way affect their material realization.

The left-hand part of the Figure essentially groups together circuits I and II adapted to ensure synchronization of the beacon at the beginning of reception of each message.

The initial clock pulse H causes a monostable multivibrator 20 to pass from the state of rest (0) to energized state (1), the duration of timing of which is greater than a clock period, and of which the return to rest furnishes a general return to zero signal RAZ of the flip-flops, registers and counters incorporated in the circuits 10, in the course of the "blank" following each message.

This first clock pulse and the immediately consecutive synchronization pulses h are sequentially charged in a register 21 of which the progression is controlled in synchronism with the reception of said pulses by the action of the circuit II connected in shunt on the circuit I coupling the reception R to the monostable multivibrator 20 and to the register 21. This circuit II comprises a switching flip-flop 22 taken to the state (0) by the energization of the monostable multivibrator 20 and through which the initial clock and synchronization pulses are directly transmitted to one of the inputs of a phase comparator 23, of which the other input is coupled to the output of a local oscillator 24 through a flip-flop-switch 25 rendered conducting by the monostable multivibrator 20 and furthermore connected to the progression control input of the register 21. The control voltage furnished by the comparator 23 to the oscillator 24 ensures its exact synchronization on the recurrence frequency of the initial pulses, equal to a multiple—for example ten—of the clock frequency.

As soon as the register 21 has stored all the initial clock and synchronization pulses, an associated AND gate 26 controls the switching of the flip-flop 22 to the state (1) in order to bring into play a circuit II' including an AND gate 27 periodically rendered conducting by a divider 28—for example by ten—coupled to the flip-flop 25 controlling the output of the oscillator 24. Consequently, only the clock pulses reach the phase comparator 23 to maintain the correct synchronization of the oscillator 24 during the following part of the message.

The signal issuing from the AND gate 26 validating the synchronization takes to the conducting state (1) a flip-flop-switch 30 to allow, by a circuit III, the sequential charging of the pulses of the addressing code in a register 31. The final contents of this register are transmitted in parallel to a comparator 32 which furthermore receives from a fixed or reprogrammable memory 33 the identification key attributed to the beacon. If the addressing code responds to this key—i.e. is identical thereto or corresponds thereto at least partially according to a determined criterion of coincidence of certain bits of the same weight—the comparator 32 emits a signal for validating the addressing code and for activating the beacon, which is transmitted by a link 34 to take a flip-flop 40 to the conducting state (1), which consequently allows the following part of the message to be taken into account by processing circuits IV and V of which the elements are shown in the right-hand half of FIG. 4.

In the example chosen, it is assumed that the initial part of the message including the first clock pulse, the synchronization pulses and the addressing code occupies a clock period, and is followed by an instruction of the same format allowing the possible reconditioning of the processing circuits of the beacon, and even the modification of its identification key.

This instruction—for example formed by a package of bits, or bytes, followed by a parity bit—is charged, by a circuit IV issuing from the flip-flop 40, in a register 41 of which the final contents are read by a processor 42. It will be noted that this register comprises a supplementary position shown in dotted lines, intended to receive the clock pulse interposed between the addressing code and the instruction.

After the instruction received by the processor 42 has been taken into account, the pulses produced by the oscillator 24 control the progression of a matrix counting and decoding circuit 50 arranged in order in particular to recognize the beginning of the space-time allocated to the beacon, from which it processes the information received and/or produces information peculiar thereto, and which essentially comprises a first ten-position stage 51 followed by an identical stage 52 mounted in cascade, the first stage being looped on itself by a link 53. It is thus possible to discriminate, in the case in question, one hundred rows of pulses, of which the units figure and the tens figure are respectively furnished by the stages 51 and 52. It will be noted that the position "0" of the first stage is not used, in order to avoid taking into account non-significant clock pulses.

In each beacon, each row of pulses to be taken into account is prescribed as desired for example by means of a pair of decimal coding wheels or, as suggested by the drawing, with the aid of a matrix selector with plugs: each plug is assumed to be equipped with an AND gate such as 54, of which the inputs are respectively coupled to a tens column (5) and to a units line (4) and of which the output is connected to one of the inputs of a multiple OR gate 55, which therefore indicates at the output the occurrence of each row displayed, namely "54" in the example in question, during the counting process. Of course, each beacon may thus be conditioned—possibly through instructions to this end furnished to the processor 42—to take into account either one pulse of specified row, or an assembly of several pulses of consecutive or non-consecutive rows.

These two hypotheses involve different modes of exploitation of the "processing" section of the beacon. For this reason, the final pulses of each message are transmitted by a circuit V issuing from the flip-flop 40 to a switching flip-flop 56 taken either to state (a) or to state (b)—for example under the control of the processor 42—according to whether one row of pulses or an assembly of a plurality of rows is displayed.

In the first case, the pulse of the specified row is transmitted by a link A controlled by an AND gate rendered conducting by the OR gate 55 to a corresponding input of so-called exploitation circuits 58, as they are coupled to the environment of the beacon by interface I/O circuits comprising pick-ups or detectors and/or effector members such as a thermocouple or a relay respectively, or signalization means.

In the second case, the pulses of specified rows are switched by the flip-flop 56 on a link B controlled by an AND gate selectively rendered conducting by the OR gate 55, in order to be sequentially charged in a register 57 of which the progression is controlled by this same OR gate, and of which the final contents are furnished to parallel inputs of the exploitation circuits 58. These latter are coupled not only to the environment of the beacon by the interface I/O circuits but also to the processor 42 on the one hand and, on the other hand, to one of the inputs of an AND gate 59 selectively rendered conducting by the OR gate 55 and by which is controlled a link VI terminating at an OR gate 60 coupled to the emission circuits S. Furthermore, this latter gate receives, by a transit circuit 0 comprising a switching flip-flop 61, the signals issuing from the reception circuits R either directly or by means of a so-called echo shift register 62 comprising more positions than the maximum format of a message.

These arrangements are justified by the fact that the processing of information effected by the exploitation circuits 58 under the control of the processor 42 if necessary, may be ensured in real time or "in flight" if one row of pulses is displayed, or must be defered until after the pending message has been completely received if a combination of a plurality of rows must be taken into account. This means that, at the beacon level, the processing of the information received or the generation of its own information, starts only after all the message has been received, the transmission of the information from one beacon to another continuing to be effected bit by bit.

In the first case, if this processing corresponds to an interrogation of the beacon involving a possible response of its exploitation circuits 58, the latter may, in the space-time allocated to the beacon, perfectly well add a bit of information for other beacons. A complex exchange of information with the beacon may be effected sequentially by means of such elementary information incorporated with successive messages, according to a convention of exploitation possibly established by a suitable instruction previously furnished to the processor 42.

If a combination of pulses must be taken into account by the beacon at the different specified rows, in its space-time, and corresponds to an interrogation which is addressed thereto, the response furnished by its exploitation circuits may consist in the selective emission on the circuit VI of "+1" pulses or of "−1" annulation at at least certain of the specified rows of the following message. In this case, the system must therefore function alternately, hence the intervention of the shift register 62, but a complex exchange of information may be effected with a couple of messages, for example outward and then return.

It will be noted that any beacon of the system may be "reconditioned" as desired within the limits allowed by its arrangement and by the interface circuits which are associated therewith.

In order words, a transmission system according to the invention, formed by any number of similar beacons, which are fixed and/or mobile and distributed in any manner in space provided that each is at any moment in relation with at least one other, may serve as vehicle for information of any nature, which may be selectively addressed to and/or requested of units designated according to a heirarchical and/or topological organization which may be modified as desired.

Finally, it is obvious that the circuits and the message formats described and illustrated have been given only by way of example and that the invention includes all means technically equivalent to those mentioned and capable of performing the various functions indicated, separately or in any operative combination. In this respect, it will be noted that the most appropriate embodiment is the one in which all the previously described functions are performed by one and the same processor.

What is claimed is:

1. In a transmission system comprising a series of identical beacons, each comprising an emitter and a receiver tuned to the same frequency, the emitter being switched on as soon as a bit of information is received from another beacon, and means for cutting off the receiver as soon as the emitter is switched on, all the beacons thus being able to receive the same information simultaneously and each beacon being able to retransmit the information received from another to all the beacons not having received information, characterized in that transmission is effected bit by bit, and the beacons each comprise: means for creating its own information and/or for processing information received, in turn; and counting means arranged to recognize the beginning of a space-time allocated to said each beacon to create its own information and/or process the information received.

2. The transmission system according to claim 1, wherein each beacon comprises detection means for allowing reception.

3. The transmission system according to claim 1, wherein each beacon comprises a local oscillator and phase comparison means for synchronising the oscillator.

4. The transmission system according to claim 2, wherein each beacon comprises a local oscillator and phase comparison means for synchronising the oscillator.

5. The transmission system of claim 3, wherein each beacon comprises switching means arranged to transmit synchronisation information to the phase comparison means.

6. The transmission system of claim 4, wherein each beacon comprises switching means arranged to transmit synchronisation information to the phase comparison means.

7. The transmission system according to claim 1, wherein each beacon comprises a register arranged to receive addressing information, a store containing an identification key, and a comparator coupled to the register and to the store to activate the beacon.

8. The transmission system according to claim 1, wherein each beacon comprises a register arranged to receive instruction information, and a processor arranged to process this instruction information.

9. The transmission system according to claim 1, wherein each beacon is constituted by a receiver, an emitter and a single processor.

* * * * *